United States Patent [19]
Wess

[11] Patent Number: 5,828,442
[45] Date of Patent: Oct. 27, 1998

[54] INDEX PRINT ATTACHABLE TO AN IMAGE RECORDING MEDIUM

[75] Inventor: Raymond Eugene Wess, Holley, N.Y.

[73] Assignee: Eastman Kodak Company, Rochester, N.Y.

[21] Appl. No.: 606,779

[22] Filed: Feb. 27, 1996

[51] Int. Cl.⁶ .................................................. G03B 27/52
[52] U.S. Cl. .............................................................. 355/40

[56] References Cited

U.S. PATENT DOCUMENTS

| | | | |
|---|---|---|---|
| 1,840,143 | 1/1932 | Weindl . | |
| 3,022,165 | 2/1962 | Solow et al. . | |
| 3,172,115 | 3/1965 | Jeffee . | |
| 4,805,039 | 2/1989 | Otake et al. . | |
| 4,903,068 | 2/1990 | Shiota | 355/20 |
| 4,933,773 | 6/1990 | Shiota et al. | 358/302 |
| 5,153,715 | 10/1992 | Bender et al. . | |
| 5,255,040 | 10/1993 | Pagano . | |
| 5,369,457 | 11/1994 | Koiwai et al. . | |
| 5,436,694 | 7/1995 | Ishikawa et al. | 355/75 |
| 5,576,836 | 11/1996 | Sano et al. | 358/302 |
| 5,617,171 | 4/1997 | Ishikawa et al. | 396/512 |

*Primary Examiner*—R. L. Moses
*Assistant Examiner*—Shival Virmani
*Attorney, Agent, or Firm*—Gordon M. Stewart

[57] ABSTRACT

An image recording medium, such as a photographic negative filmstrip, has recorded thereon a plurality of images. An index print includes a support sheet on which are recorded a plurality of positive images corresponding to the plurality of images recorded on the filmstrip. The support sheet is physically attached directly to the filmstrip, thereby inhibiting separation of the index print from its filmstrip.

16 Claims, 4 Drawing Sheets

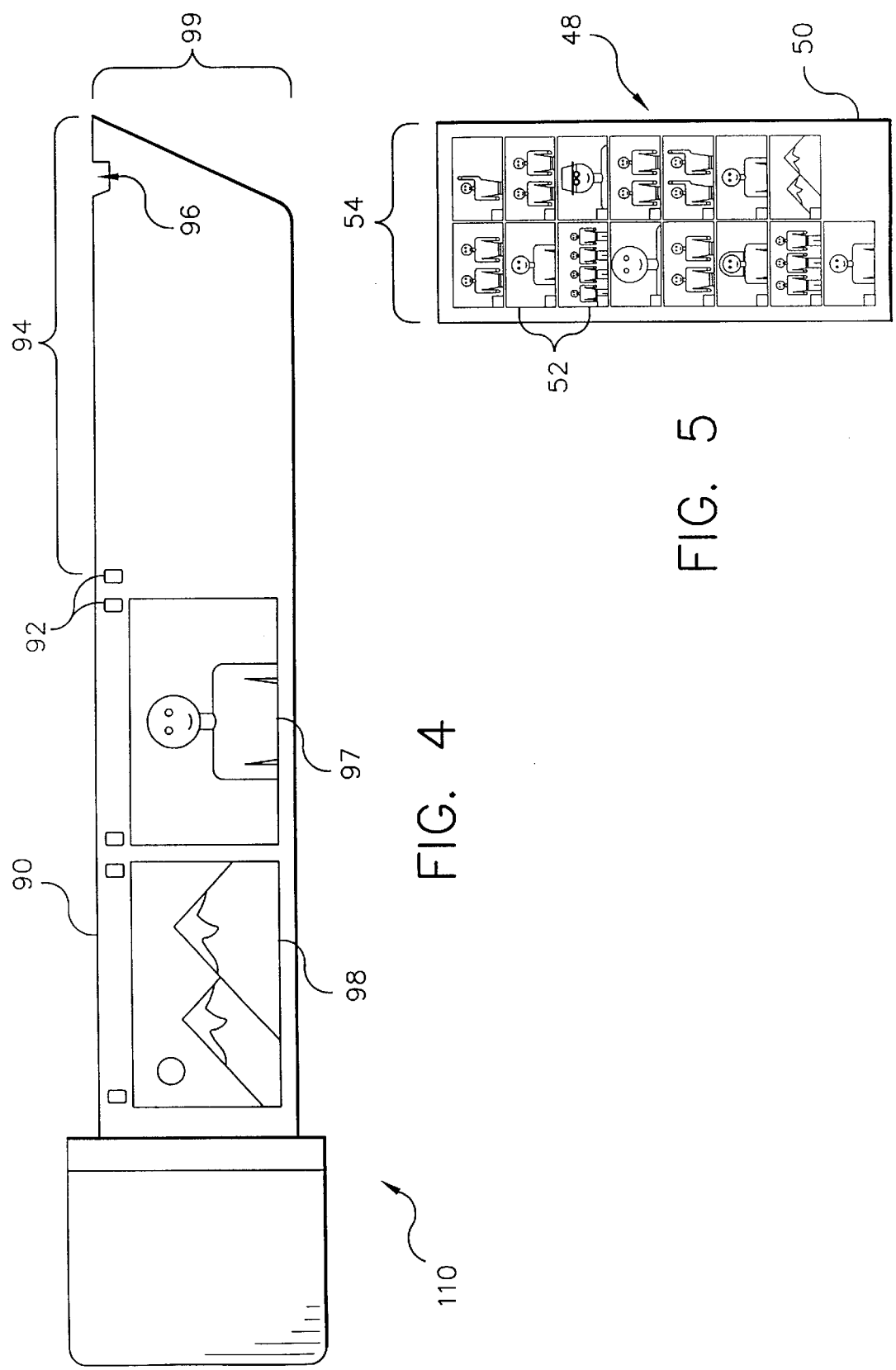

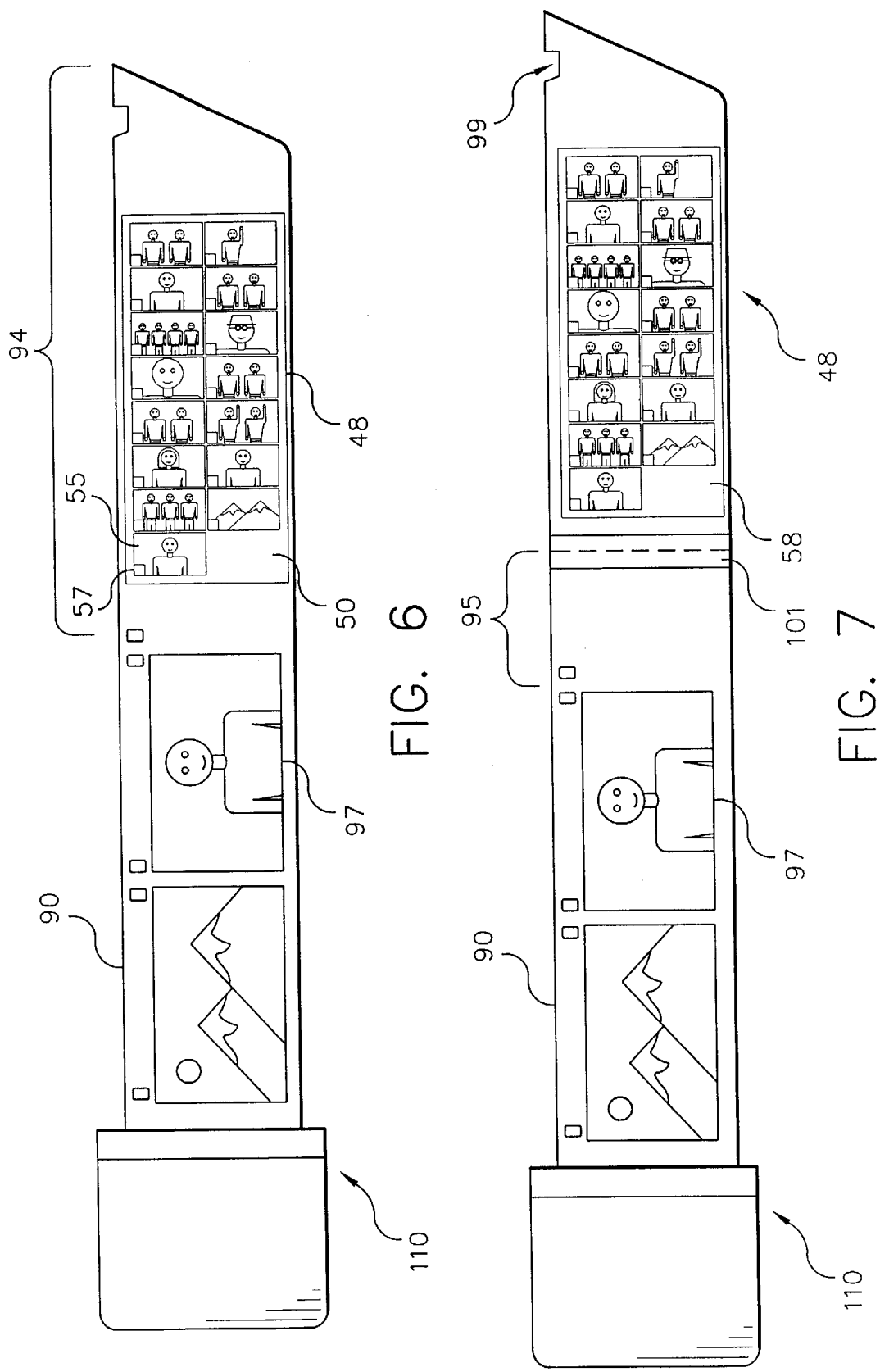

INDEX PRINT ATTACHABLE TO AN IMAGE RECORDING MEDIUM

CROSS-REFERENCE TO RELATED APPLICATION

Reference is made to commonly assigned copending application Ser. No. 60/002,322, filed in the names of Frosig and Wess on Jul. 31, 1995.

FIELD OF THE INVENTION

The invention relates generally to the field of imaging, and in particular to index prints. More specifically, the invention relates to an index print which is attachable to its associated image recording medium.

BACKGROUND OF THE INVENTION

U.S. Pat. No. 4,805,039 (the '039 patent) discloses an index sheet (print) that includes a recording sheet on which are recorded a plurality of positive images. The plurality of positive images correspond to images recorded on an image recording medium such as a video tape, optical disk, photographic negative filmstrip, etc. Images recorded on an optical disk or video tape can only be viewed by loading the disk or tape into an appropriate player and viewing the images on a monitor. Images recorded on a negative filmstrip can be difficult to discern because they are the negative of the actual scene recorded by the camera.

The index print serves the purpose of quickly and clearly informing a person of the exact image content recorded on the image recording medium. With an optical disk or video tape, the image content can be quickly discerned by viewing the index print without having to load the optical disk or video tape into a player. Index prints are also very useful when reordering prints from images recorded on a negative filmstrip. Rather than having to guess which of the negative images is to be reprinted, one need only look at the index print which typically has the associated negative frame number printed next to each positive image.

As shown in FIG. 11 of the '039 patent, the index sheet 70 is stored in a transparent pocket 105 of a book-shaped casing 100. A negative sheath 108 for storing the photographic filmstrip associated with the index print is also stored in pocket 105. Photographs 103 made from the negatives are also stored in the casing in a pair of recesses 101, 102. Although such an arrangement enables the index sheet, negatives and photographs to be stored together, it is still possible for the index sheet to become separated from its associated filmstrip. For example, if the index sheet or negatives are removed from casing 100 and not later returned to the casing, the index sheet and its associated negatives can become permanently separated, thereby defeating the purpose of the index sheet (e.g. for reordering prints from the photographic negatives).

SUMMARY OF THE INVENTION

The present invention is directed to overcoming one or more of the problems set forth above. Briefly summarized, according to one aspect of the present invention, an image recording medium has recorded thereon a plurality of images. An index print includes a support sheet on which are recorded a plurality of positive images corresponding to the plurality of images recorded on the image recording medium. The support sheet is physically attached directly to the image recording medium, thereby inhibiting separation of the index print from its associated image recording medium.

Because the index print is attached directly to the image recording medium, the index print can always serve its purpose of informing a viewer quickly and accurately of the image content of the image recording medium. The owner of the image recording medium and index print need not fear that the index print will become separated from the image recording medium.

These and other aspects, objects, features and advantages of the present invention will be more clearly understood and appreciated from a review of the following detailed description of the preferred embodiments and appended claims, and by reference to the accompanying drawings.

BRIEF DESCRIPTION OF THE DRAWINGS

FIG. 4 is a top view of the cartridge of FIG. 1 with a filmstrip protruding therefrom;

FIG. 5 is an index print created by the apparatus of FIG. 2;

FIG. 6 is FIG. 4 with the index print of FIG. 5 attached to the filmstrip; and

FIG. 7 is another embodiment showing the index print of FIG. 5 attached to the filmstrip.

DETAILED DESCRIPTION OF THE INVENTION

Figure 1:
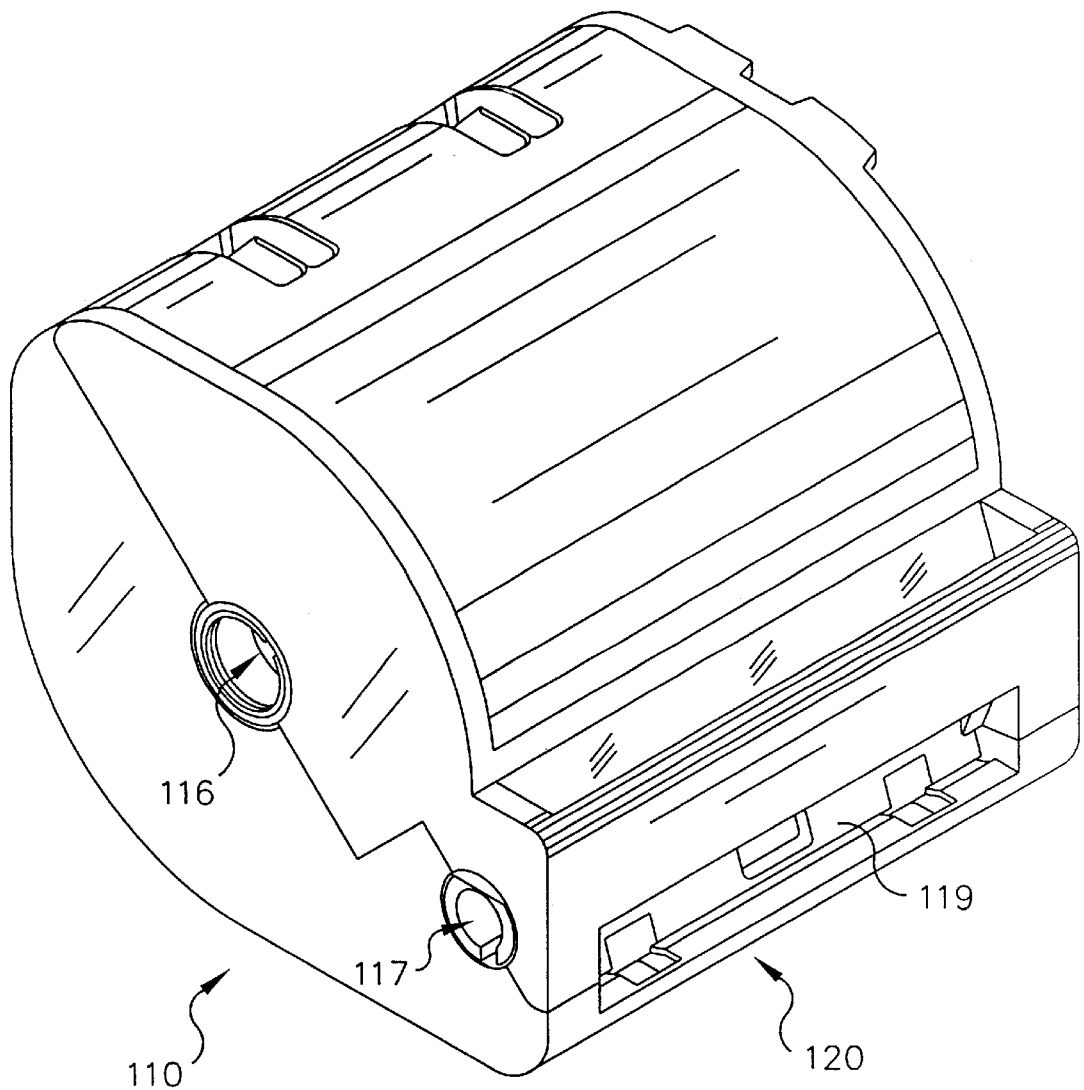
FIG. 1 is a perspective view of a photographic filmstrip cartridge.
Figure 3:
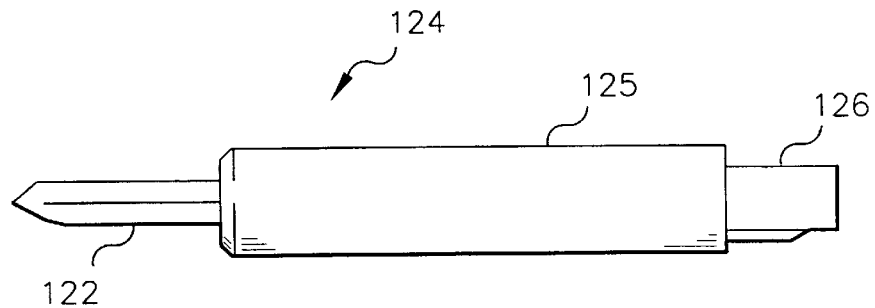
FIG. 3 is a side view of a hand-holdable drive member for manipulating a door and spool of the cartridge in FIG. 1.

Beginning with FIGS. 1 and 3, a photographic filmstrip cartridge 110 contains a developed photographic negative filmstrip (image recording medium) on which are recorded a multiplicity of images. One end of the filmstrip is secured to a rotatable spool within the cartridge, the remainder of the filmstrip being wrapped about the spool. The filmstrip within the cartridge preferably includes a transparent magnetic layer for recording information related to the filmstrip, picture taking conditions, etc. Such information can be recorded on the magnetic layer by a magnetic write head in a photographic camera. The film cartridge includes a light lock door 119 (shown in a closed position) rotatable between an open position, allowing the filmstrip to exit the cartridge through an opening 120 adjacent the door, and a closed position sealing the inside of the cartridge in a light tight manner.

Door 119 is rotated from the closed position to the open position by inserting a first end 122 of a hand-holdable drive member 124 (FIG. 3) into a keyway 117 of door 119, and then rotating the drive member counter-clockwise. Drive member 124 includes a finger grasping portion 125. Once door 119 is in the open position, a second end 126 of drive member 124 is inserted into a keyway 116 of a cartridge spool contained within cartridge 110 and rotated counter-clockwise to rotate the spool and thereby thrust the filmstrip out of cartridge 110 through opening 120. To return the filmstrip into cartridge 110, drive member 124 is rotated clockwise. Once the filmstrip is completely housed within cartridge 110, drive member 124 is removed from keyway 116 of the spool and end 122 of the drive member is inserted into keyway 117 of door 119. Drive member 124 is then rotated clockwise to rotate door 119 from its open position to its closed position. Such a cartridge and filmstrip are well known to those skilled in the art.

Figure 2:
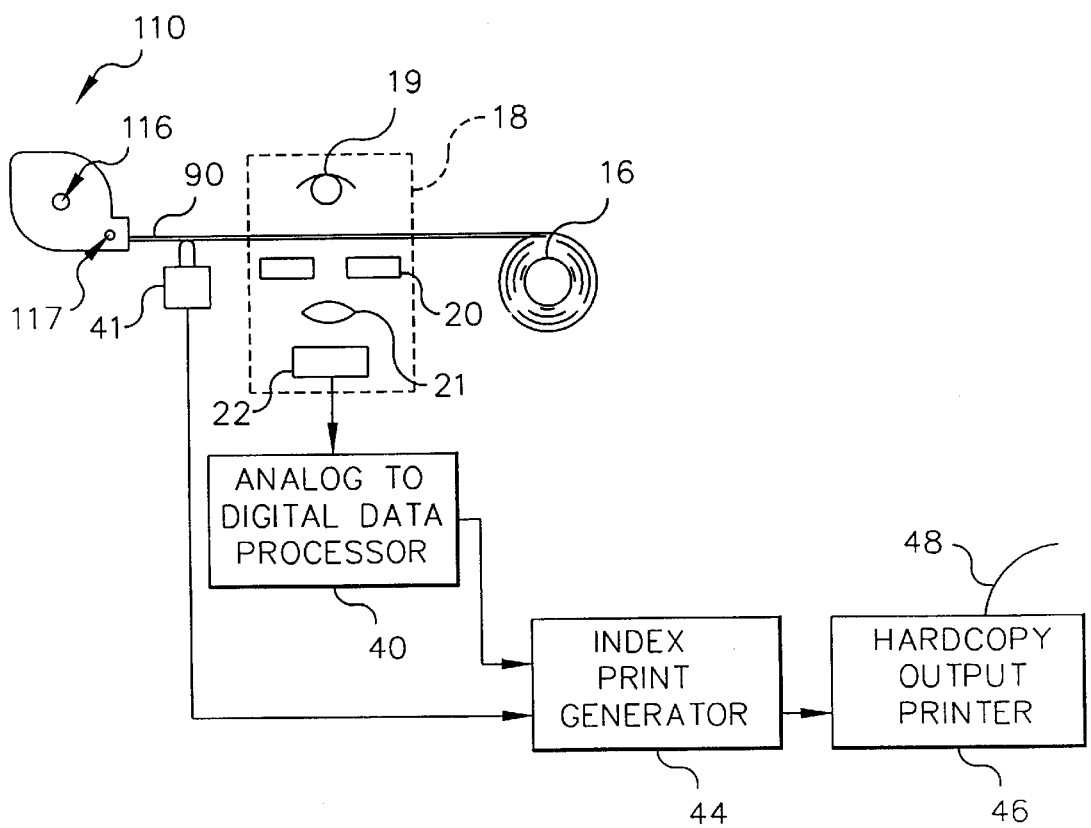
FIG. 2 is a schematic representation of an apparatus for making index prints from images recorded on a photographic filmstrip contained in the cartridge of FIG. 1.

Turning to FIG. 2, an apparatus for producing an index print from a photographic filmstrip 90, contained in cartridge 110, is shown. An automatic, electrically powered door drive member (not shown), having an end similar to end 122 of drive member 124, is engaged into keyway 117 of cartridge door 119 and rotated counter-clockwise to rotate door 119 from its closed position to its open position. An automatic, electrically powered spool drive member (not shown), having an end similar to end 126 of drive member 124, is then engaged into keyway 116 of a spool contained within cartridge 110 and rotated counter-clockwise to thrust filmstrip 90 out of cartridge 110.

Filmstrip 90 is then advanced by transport means (not shown) from cartridge 110 through a film scanner (reader) 18 to a take-up reel 16. Scanner 18 is typically provided with a light source 19 to shine light through a film frame on filmstrip 90 positioned in a frame gate 20. The resultant image light is focused by a lens 21 onto a scanning image sensor 22 which may take the form of any of a variety of scanning devices such as a linear or two dimensional area array charge coupled device (CCD).

Although scanner 18 is shown with optical focusing of the film image onto sensor 22, it will be appreciated that scanner 18 may employ virtual contact of the type disclosed in commonly assigned U.S. Pat. No. 5,153,715 entitled COLOR FILM SCANNING APPARATUS, the disclosure of which is incorporated herein by reference. With a virtual contact scanner, optical focusing lens 21 is eliminated and scanner 22 preferably comprises a tri-linear CCD device which is placed closely adjacent the underside of filmstrip 90. In this arrangement, scanning sensor 22 comprises a 480 element by 3 line color linear CCD imager with each line being provided with a color filter (e.g. red, green and blue) to be individually responsive to separate colors in the image. In operation, the sensor images a predetermined film width with the film motion providing the page or lengthwise scan of the film frame image. Thus, image data, including image density and color, is generated in a 480V by 252H (vertical by horizontal) format.

The output of sensor 22, in a scanned pixel analog signal form, is applied to an analog-to-digital data processor 40 to be converted in known manner into digital values representative of the analog pixel information received from scanner sensor 22. The digital values are forwarded to an index print generator 44. Assuming the system utilizes eight bits per pixel for each of the three colors from the scanner, 256 color levels can be resolved for each color in each pixel.

A magnetic read/write head 41 is adapted to read information recorded on the magnetic layer on filmstrip 90. The information read by magnetic head 41 is passed to index print generator 44. This information can include for each film frame, a date the image was recorded on the film, a frame number and a designated aspect ratio for printing (e.g. panoramic). Magnetic head 41 inputs frame counts to index print generator 44 to keep track of the accumulated number of film frames stored in generator 44 and also to correlate the frame numbers to the individual images in the index print matrix.

At index print generator 44, the digital data is processed and stored as a matrix of film frame image signals suitable for use in producing an index print. In a particularly preferred form of the invention, index print generator 44 is adapted to process this data in several modes, depending upon the specific requirement of an output printer system 46. For example, the image data from A/D data processor 40 can be processed and stored in generator 44 in full 480V by 252H resolution for high quality index prints. Alternatively, the data can be buffered (stored) in, for example, a 160V by 252H resolution for medium quality index prints or in 24V by 36H resolution for lower quality index prints, all depending on the output printer system image resolution printing characteristics. Suitable examples of arrangements for producing an index print matrix from scanned image data are described in U.S. Pat. Nos. 4,903,068 and 4,933,773, the disclosures of which are incorporated herein by reference.

When a predetermined number of filmstrip images are accumulated in index print generator 44, the stored image data is output to hard copy printer 46 for generating a desired index print 48. Hard copy printer 46 may be any well known form of color printer, depending on the nature of the prints being produced. Examples of suitable printers would be a thermal dye printer, inkjet printer, laser printer, electrophotostatic printer or the like. The scanned film frame image signals used to generate the index print signal data may be applied directly to output printer 46 without any exposure correction or they may be adjusted for color and/or density corrections using exposure correction data. In the latter case, the appearance of the index prints is improved. Index print generator 44 operates in a well known manner to determine the correct exposure or digital printing values for printing the index print.

With reference to FIG. 4, cartridge 110 is shown with photographic filmstrip 90 protruding from the cartridge. Pairs of metering perforations 92 are located adjacent a top edge of the filmstrip. A lead end portion 94 of filmstrip 90 has no images recorded thereon and, in this embodiment, is approximately 15.24 cm long. A notch 96, located at a fore end of portion 94 identifies the very first portion of the filmstrip. A pair of images 97 and 98 are recorded on filmstrip 90. In this embodiment, there are fifteen images recorded on the filmstrip, with thirteen of the images still being housed in cartridge 110. Further, assuming these images were exposed in a prewind type camera, image 97 was the fifteenth and last image to be exposed onto filmstrip 90.

Referring to FIG. 5, index print 48 is shown as including a support sheet 50 on which are recorded in two rows a plurality of color positive images 52 corresponding to the images which are recorded on filmstrip 90. Images 52 could alternatively be arranged in a single row on the support sheet in the same successive order as the images are arranged in a single row in successive order on the filmstrip. The term rows as used herein covers groups of images 52 extending in a lengthwise direction along support sheet 50. A width 54 of support sheet 50 is preferably substantially similar to or slightly smaller than a width 99 of filmstrip 90. Preferably, width 54 and width 99 are both about 24 mm. Support sheet 50 can be made of a variety of materials such as polyethylene napthalate (PEN), polyethylene terepthalate (PET, e.g. Estar® film base from Kodak®), thermal print receiver material (including strippable thermal print receiver material) and silver halide paper emulsions coated on PET material approximately 0.102 mm thick.

Turning to FIG. 6, index print 48 of FIG. 5 has been attached directly to lead end portion 94 of filmstrip 90. In this embodiment, support sheet 50 is preferably about 0.051 mm thick and is made of a strippable thermal media or PET. The support sheet is made extremely thin so that filmstrip 90 can be completely wound back into cartridge 110 without interference from index print 48. Support sheet 50 is attached to lead end portion 94 by applying an adhesive layer to the non-image side of the support sheet and then pressing the support sheet onto portion 94. A color positive image 55 on index print 48 corresponds to image 97 on filmstrip 90. As such, positive image 55 includes a frame number 57 which reads "15" to indicate that image 97 was the fifteenth image recorded on the filmstrip. The width of support sheet 50 is slightly less than the width of filmstrip 90 in this embodiment, but is still substantially similar to the width of the filmstrip.

FIG. 7 discloses another embodiment of the invention. In this embodiment, lead end portion 95 of filmstrip 90 has been cut off to square up the very fore end of the lead end portion. Index print 48 has been created on a support sheet 58 which has a geometry the same as a major portion of lead end portion 94 of FIG. 6. Support sheet 50 even includes a notch 99 similar to notch 96 in lead end portion 94 (FIG. 4). Such similar geometry allows the filmstrip to be continued to be manipulated by automatic film handling apparatus even though part of the lead end portion of the filmstrip has been cut off. Support sheet 50 also has a square end which is butted up against the square end of lead end portion 95. A 0.051 mm thick strip of Mylar tape 101 is pressed onto the border (represented by a dotted line) of support sheet 58 and lead end portion 95 to join the two together. In this embodiment, support sheet 58 is preferably 0.102 mm thick (preferably the same thickness as filmstrip 90) or twice as thick as the embodiment shown in FIG. 6. Support sheet 58 can be thicker because it is not being overlaid on top of the filmstrip.

The invention has been described with reference to a preferred embodiment. However, it will be appreciated that variations and modifications can be effected by a person of ordinary skill in the art without departing from the scope of the invention.

I claim:

1. An image recording medium on which are recorded a plurality of images, and an index print including a support sheet on which are recorded a plurality of positive images corresponding to the plurality of images recorded on the image recording medium, is characterized in that:

the support sheet is physically attached directly to the image recording medium, thereby inhibiting separation of the index print from its associated image recording medium.

2. The combination of claim 1, wherein said image recording medium is a photographic strip of film, the support sheet being attached to a lead end of the strip of film.

3. The combination of claim 2, wherein the positive images are arranged on the support sheet in a single row in the same successive order as the images are arranged in a single row in successive order on the strip of film.

4. The combination of claim 2, wherein the positive images are arranged on the support sheet in two rows.

5. The combination of claim 2, wherein the support sheet has a width substantially similar to a width of the strip of film.

6. The combination of claim 2, further comprising:

a cartridge for housing the strip of film, the support sheet being dimensioned such that it can also be housed within the cartridge.

7. The combination of claim 6, wherein the support sheet has a width substantially similar to a width of the strip of film.

8. An index print including a support sheet on which are recorded a plurality of positive images corresponding to a plurality of images recorded on a photographic strip of film, is characterized in that:

the support sheet is in strip form and is substantially the same width as the strip of film, such that if the support sheet is attached to the the index print appears to be a continuation of the strip of film.

9. The index print of claim 8, wherein the positive images are arranged on the support sheet in a single row in the same successive order as the images are arranged in a single row in successive order on the strip of film.

10. The combination of claim 8, wherein the positive images are arranged on the support sheet in two rows.

11. A method of forming a combined photographic strip of film and index print, comprising the steps of:

reading a plurality of images recorded on the strip of film;

making an index print by using the read plurality of images to form corresponding positive images on a support sheet; and physically attaching the support sheet directly to the strip of film.

12. The method of claim 11, wherein the making step creates the index print on a support sheet having substantially the same width as the strip of film.

13. The method of claim 12, wherein the attaching step attaches the support sheet directly to the strip of film such that the index print appears to be a continuation of the strip of film.

14. The method of claim 13, further comprising the step of:

winding the strip of film and support sheet completely into a cartridge for housing the strip of film and index print.

15. The combination of claim 1 wherein image recording medium is a negative strip of film.

16. The combination of claim 1 wherein the image recording medium is a strip of film, the combination further comprising:

a cartridge for housing the strip of film, the support sheet being dimensioned such that it can also be housed within the cartridge.

* * * * *